May 10, 1932. H. L. BUDD 1,857,937
BACK FOR PICTURE FRAMES
Filed June 28, 1929
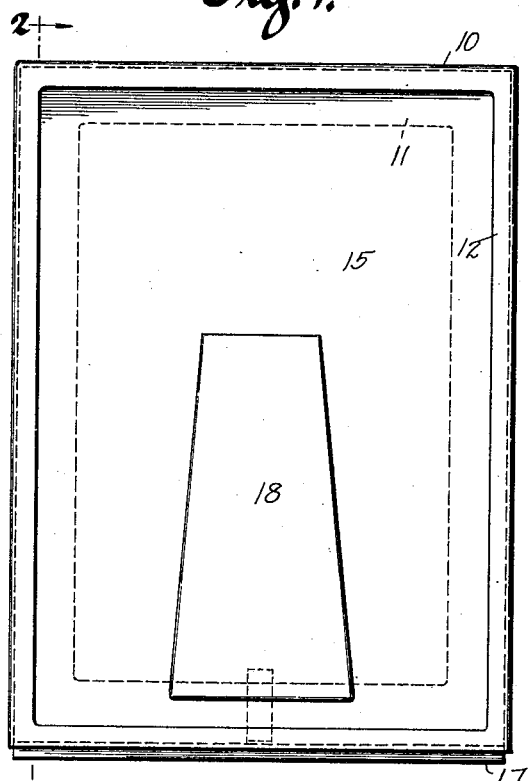
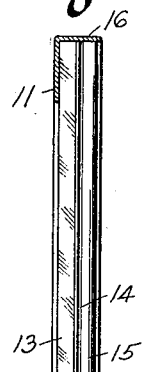
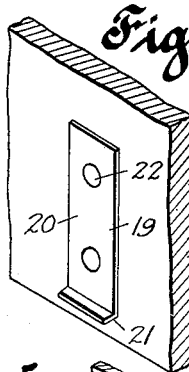
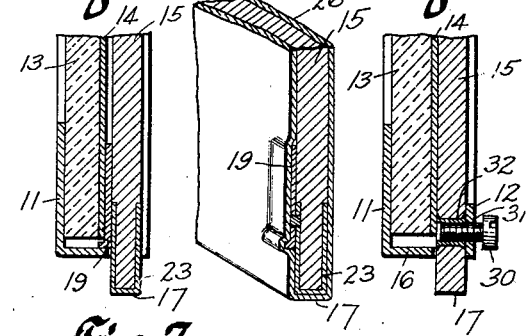
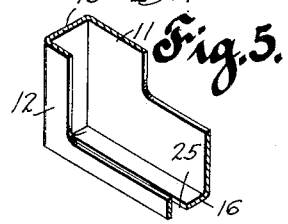
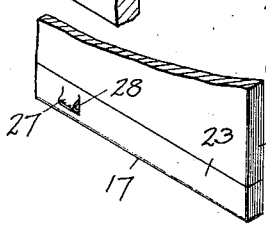
INVENTOR
Howard L. Budd
BY
Harry Jacoban
ATTORNEY Patented May 10, 1932

1,857,937

UNITED STATES PATENT OFFICE

HOWARD L. BUDD, OF BROOKLYN, NEW YORK, ASSIGNOR TO FRIEDMAN SILVER CO., INC., OF BROOKLYN, NEW YORK, A CORPORATION OF NEW YORK

BACK FOR PICTURE FRAMES

Application filed June 28, 1929. Serial No. 374,316.

This invention relates to frames for pictures, mirrors and the like, and particularly, to the means for holding the back thereof in place.

My invention contemplates the provision of simple, inexpensive and efficient means for removably holding the back of a frame in operative position to the frame without the necessity for using clips or other means of more or less intricate design.

The various objects of my invention will be clear from the description which follows and from the drawings, in which, Fig. 1 is a rear view of a picture frame to which my improved back has been applied.

Fig. 2 is a vertical section of said frame, showing one form of my improved holding means, the thicknesses of the parts being exaggerated for clearness and the frame being slightly modified.

Fig. 3 is a similar view thereof, showing a modified form of my invention.

Fig. 4 is a perspective view of one form of my improved device for holding the back in place.

Fig. 5 is a perspective view of a frame wherein a rear flange is arranged at the bottom as well as the top and sides and said flange is slotted.

Fig. 6 is a sectional view similar to Fig. 3 of the back, showing the velvet or other covering.

Fig. 7 is a perspective view of the back showing another form of the holding means, and Fig. 8 is a sectional view of the bottom part of the frame and back showing another form of such means.

In that practical embodiment of my invention which I have illustrated by way of example, the main frame 10 is preferably U-shaped in cross-section and is preferably made of comparatively thin metal designed to be ornamented, the rigidity of the frame depending largely upon its cross-sectional shape. The flange 11 at the front of the U may be comparatively wide and forms the visible face of the frame while the shorter flange 12 may form the rear face of the frame, and is arranged substantially parallel to the front flange and spaced therefrom at least a distance substantially equal to the combined thicknesses of the glass 13, the picture 14 and the back 15, or a greater distance if desired. The flanges 12 may extend about the top of the frame and the sides thereof at the rear, but if desired, need not extend across the bottom edge of the frame as shown in Figs. 2 and 3 for the reason which will shortly appear. The web 16 of the U extends between and is integrally connected with the front flange 11 and the rear flange 12.

At the bottom edge of the frame, the web 16 is made substantially as wide or slightly wider than the thickness of the glass 13 and as has been previously pointed out, the flange 12 at said edge may be entirely omitted (Figs. 2 and 3). However, instead of omitting the bottom section of the flange, a slot as 25 may be made instead in the web 16. By means of this construction, the back 15 may be slidably moved into its proper position first by the insertion of the top edge thereof through the slot 25, or between the oppositely disposed rear parallel sections of the flange 12, and then by sliding the back vertically upwardly, until the top edge is inserted underneath the top section of the flange 12. I prefer to make the back 15 of sufficient length to extend below the bottom of the frame 10, so that the entire frame is supported by resting the lowermost edge 17 of the back on a suitable supporting surface with or without the additional support of the easel 18.

For maintaining the back 15 against movement out of the frame, I prefer to provide means adapted to engage either of the lowermost section of the web 16 or the lowermost section of the flange 12, as well as the back 15.

As an example of such means, I have shown the angle member 19 which is made of comparatively thin sheet metal and consists of an upstanding portion 20 and a compartively short horizontal portion 21. The upstanding portion may be secured to the inner face of the back 15 in any suitable manner. As illustrated in Fig. 2, I have shown rivets as 22 for this purpose although it will be understood that suitable screws or other fastening elements may be substituted for the rivets in a manner which is well understood and hence need not be shown nor described in detail.

If desired, the upstanding portion may be secured to the non-metallic back by soldering said portion to a suitable edge reinforcing metallic member as 23 such as I have described in my co-pending application for patent, Serial No. 364,356, filed May 20th, 1929.

Since the portion 21 of the angle member 19 is very short, it will be seen that as the back 15 is pushed upwardly into place, while stressed slightly rearwardly to allow said portion 21 to clear the front edge of the slot 25 on the rear edge of the web 16, said portion 21 will snap underneath the glass 13 as it reaches its uppermost positon, since the back is forced close to the picture by means of the side sections of the flanges 12. There is usually sufficient play or space between the glass 13 and the top and bottom of the frame for the portion 21 which, of course, is very thin, to enter therebetween and to engage the web 16.

To remove the back, it need merely be pressed slightly rearwardly a sufficient distance to disengage the portion 21 from the web 16 whereupon the back is free to slide downwardly and out of the frame.

It will be understood that the back 15 is normally covered through with velvet or other suitable covering material as 26 and that the angle 19 may also be so covered as illustrated in Fig. 6 without affecting the operation of my improved holding device.

As shown in Fig. 7, the angle member 19 may be eliminated and a more or less spring-like projection as 27 may be pressed out of the inner face of the reinforcing member 23 by making parallel cuts 28 and a third cut joining said parallel cuts if necessary. Said member 27 acts similarly to the angle member 19 as it snaps on to the upper face of the lowermost web 16 when the back slides upwardly into position.

As illustrated in Fig. 8, the holding means may take the form of a screw 30 passed through a suitable hole as 31 in the lowermost section of the rear flange 12 and removably held in place by threading said screw to a suitable internally threaded eyelet 32 secured to the back 15 at the desired point. It will be seen that in this form of holding means, the screw may be turned to release the back 15 in one direction or turned in the other direction to secure the back in place after it has first been moved into position.

In place of the threaded screw and the internal threads on the eyelet 32, I may provide a spring tending normally to pull said screw or a similar unthreaded pin into the eyelet and to resist the withdrawal of said screw from the eyelet in a manner which is well understood and hence need not be illustrated. In that case, the screw 30 need not be rotated but need merely be pulled rearwardly to release the back when released, reengages the back.

It will be seen that I have provided simple, economical and efficient means adapted to be operated by unskilled persons unfamiliar with such devices for holding the back of a picture frame in place and which may easily be operated for the purpose of removing the back when desired.

It will further be seen that I have provided a structure well adapted to meet the requirements of practical use. While I have shown and described a specific embodiment of my invention, I do not wish to be understood as limiting myself thereto but intend to claim my invention as broadly as may be permitted by the state of the prior art and the terms of the appended claims.

I claim:

1. The combination with a picture frame of thin metal substantially U-shaped in cross-section and having a partly open bottom, of a glass for the frame, a back slidable vertically through the open bottom and a thin metallic L-shaped member having a longer leg secured to said back and having a shorter leg projecting inwardly from the back and adapted to rest on the inner face of the lowermost part of said frame between said inner face and the bottom of the glass for preventing removal of said back until said back has first been moved slightly rearwardly to disengage said shorter leg from the frame and the glass.

2. The combination with a picture frame having a horizontal bottom flange and rear flanges, of a slidable non-metallic back for the frame, a thin, metallic non-resilient member secured to the back adjacent the lower edge of the back, and having a longer leg and a shorter leg substantially perpendicular to the longer leg projecting from the back toward the front of the frame and adapted to engage said bottom flange, and to rest normally on the upper surface of the bottom flange for preventing removal of the back from the frame until said back has first been moved slightly rearwardly to disengage said member from the flange, and for then permitting removal of the back.

3. The combination with a picture frame, U-shaped in cross-section and including a horizontal bottom web extending rearwardly from the front lowermost edge thereof, and including a similar top horizontal web, of a back member adapted to fit into said frame and to be inserted thereinto through the bottom, said back being of sufficient length to project below the horizontal flange, and a concealed metallic member projecting forwardly from the front face of the back toward the front of the frame and arranged slightly above and adjacent to the bottom edge of the back and having its under surface spaced from the upper edge of the back a distance substantially equal to the distance between the upper surface of the bottom web and the lower surface of the top web, and adapted to engage and rest upon the upper surface of said flange when the back is in its uppermost position to provide the sole means for locking the back to the frame against downward movement of the back until the back is released by moving said back slightly rearwardly to disengage the member from the flange, and for then unlocking the back to permit its removal.

4. The combination with a metallic picture frame, U-shaped in cross-section and having a front flange, a substantially parallel but shorter rear flange and a web connecting said flanges, and having the bottom portion of the web thereof slotted, of a glass inserted into said frame through the slot in the web, a non-metallic back adapted to be inserted between said flanges through said slot and of sufficient length to extend below said slot in the operative position of the back, a thin metallic L-shaped member secured to the front face of said back, and projecting forwardly of said front face a distance substantially equal to its thickness, and a velvet covering for the back, covering said member, and bulged forwardly by the projecting portion thereof, said back being retained in its operative position by the pressure of the projecting portion of said member upon the upper face of said bottom web through the intermediary of the velvet covering, and said member being adapted to be sprung into position between the lower edge of the glass and the upper face of the bottom web under the pressure of the rear flange upon the rear face of the back.

5. The combination with a picture frame having a bottom flange and rear flanges spaced from the front of the frame, of a non-metallic back adapted to be inserted within the frame, and means for anchoring said back to the frame, said means being concealed in the operative position of the back and comprising a metallic member secured to the back adjacent the lower edge of the back and having a portion thereof projecting forwardly of the front face of the back and in the assembled position of the back resting on the upper face of the bottom flange.

6. The combination with a frame having a horizontally disposed lower flange and rear flanges, of a non-metallic slidable back for the frame pressed forwardly by the rear flanges when in assembled position, means for anchoring the back to the front comprising a metallic member secured to and projecting forwardly from the front face of the back and adapted to engage the flange to rest thereupon in the assembled position of the back, and comprising the sole means for preventing removal of the back by downward movement from the frame until said back has first been moved slightly rearwardly to disengage the member from the flange, and a fabric covering for the back bulged slightly forwardly by the projecting part of the member.

7. The combination with a picture frame including rear flanges, a horizontal top web and a horizontal bottom web, of a non-metallic back sufficiently resilient to be sprung slightly rearwardly, and inserted into the frame in front of the rear flanges, and a non-resilient metallic projection extending forwardly of the front face of the back and having its lowermost surface spaced from the upper end of the back a distance substantially equal to the vertical distance between the lower surface of the top web and the upper surface of the bottom web, said back being slidable upwardly past the bottom web on the slight distortion of the back rearwardly during the sliding of the back into place in the frame, and resting on the upper face of said web in the assembled position of the back and when said back is released, and thereby preventing downward movement of the back until said back is again similarly distorted.

8. The combination with a picture frame having a slot in the bottom thereof, and rear flanges of a slidable back passed through the slot into the frame forwardly of the rear flanges, and a metallic member projecting forwardly of and secured to the back near the lower edge of the back and in the assembled position of the frame resting on the upper surface of the bottom forwardly of the slot.

9. The combination with a picture frame having front flanges, rear flanges, and a web joining the flanges, of a back slidable into the frame forwardly of the rear flanges and pressed by said rear flanges toward the front flanges, a narrow metallic strip secured to the bottom edge of the back, and a projection extending forwardly of the strip and resting on the lowermost part of the web in the assembled position of the back.

10. In a back for a picture frame, a non-metallic sheet adapted to be fitted into a frame, a metallic reinforcing strip for the lower edge of the back, and a metallic projection extending forwardly of the front face of the back near the lower edge thereof.

HOWARD L. BUDD.